United States Patent [19]
Vogelsanger et al.

[11] 3,987,276
[45] Oct. 19, 1976

[54] WELDED PLASTIC ATTACHMENT SUBASSEMBLY

[75] Inventors: Kurt Vogelsanger; Hugo Rechsteiner, both of Schaffhausen, Switzerland

[73] Assignee: Georg Fischer Aktiengesellschaft, Schaffhausen, Switzerland

[22] Filed: May 9, 1975

[21] Appl. No.: 576,026

[30] Foreign Application Priority Data
May 10, 1974 Switzerland.......................... 6405/74

[52] U.S. Cl............................. 219/535; 156/275; 156/380; 219/544; 285/21; 264/27
[51] Int. Cl.².......................................... H05B 3/58
[58] Field of Search ............ 219/535, 544; 156/275, 156/293, 380, 499; 264/27; 285/21; 137/318

[56] References Cited
UNITED STATES PATENTS

| | | | |
|---|---|---|---|
| 3,061,503 | 10/1962 | Gould et al. ......................... | 156/275 |
| 3,062,940 | 11/1962 | Bauer et al. ......................... | 219/544 |
| 3,094,452 | 6/1963 | VonRiegen et al. ................. | 156/275 |
| 3,240,226 | 3/1966 | Burkholder......................... | 137/318 |
| 3,406,055 | 10/1968 | Rubel................................. | 156/275 |
| 3,743,566 | 7/1973 | Louthan et al. .................... | 156/499 |
| 3,918,748 | 11/1975 | Acda.................................. | 285/21 |

FOREIGN PATENTS OR APPLICATIONS

| | | | |
|---|---|---|---|
| 217,080 | 11/1956 | Australia............................. | 219/544 |
| 1,055,305 | 4/1959 | Germany ............................. | 285/21 |
| 523,697 | 11/1972 | Switzerland......................... | 219/544 |
| 1,223,128 | 2/1971 | United Kingdom.................. | 285/21 |

*Primary Examiner*—Volodymyr Y. Mayewsky
*Attorney, Agent, or Firm*—Toren, McGeady and Stanger

[57] ABSTRACT

A weldable subassembly for connecting branch pipes to a molded plastic main pipe is formed with a pair of hinged arcuate members adaptable to be placed around the main pipe and welded thereto by electrical current passed through an interposed mat containing electrical heating wires. The arcuate members are pivotally interconnected by a hinge member which extends on one side thereof longitudinally of the main pipe, and which enables separation of the opposite side of the arcuate members so that they may be placed about the pipe. The opposite sides of the arcuate members form a slight gap therebetween which also extends longitudinally of the main pipe and the heating wire mat has a longitudinal edge which is attached, by welding or the like, to the inner surface of one of the arcuate members at a point intermediate the hinge member and the opposite side of the arcuate member.

7 Claims, 3 Drawing Figures

WELDED PLASTIC ATTACHMENT SUBASSEMBLY

BACKGROUND OF THE INVENTION

The present invention relates generally to means for welding together a pair of moldable plastic units. More particularly, the invention relates to a device for welding moldable plastic branch pipes upon a plastic main pipe. The invention involves the use of a unit or subassembly which generally comprises a molded centering piece of weldable plastic for connecting at least one branch pipe with a main pipeline, also formed of weldable plastic. The attachment unit or subassembly comprises a pair of arcuate parts which are to be placed around the main pipeline and which are to be welded thereto by means of an interposed electrical wire layer, with at least one of the parts of the attachment subassembly having a centering or branch piece.

One prior art embodiment of a molded centering piece of thermoplastic material is known from Swiss Pat. No. 528697 wherein a saddle part with a centering piece and a branch pipe embraces a main pipe together with a complimentary shell-shaped body secured by screws on the saddle part. In this embodiment, spirally wound bifiler or monofil sheathed welding wires are imbedded in an inner surface. In this molded centering piece, the saddle part and the shell-shaped body are individually welded and only locally welded with the main pipe. The assembly which must be performed on the construction site with screws necessary for the connection of the two parts is complicated and time consuming.

Furthermore, production of the two molded parts with the imbedded wire is elaborate, because of the relatively complicated arrangement of the welding wires.

It is an object of the present invention to provide a molded centering piece with a simple heating wire arrangement which is easy to produce and assemble, which can be arranged on a pipeline without additional screw joints with a minimum of assembly work, and which can be welded with the pipeline in an appropriate manner to insure a firm and tight branch connection.

SUMMARY OF THE INVENTION

Briefly, the present invention may be described as a weldable modular subassembly for enabling branch pipe means to be connected by welding to a main pipe formed of weldable plastic material. The subassembly comprises a pair of arcuate attachment members formed of moldable plastic and each having a concave inner surface. The inner surface of each of the attachment members extends between a pair of longitudinal edges thereof and branch pipe means are fixed to at least one of the attachment members. A hinge member pivotally interconnects each of the attachment members along one of the longitudinal edges thereof, with the other of the longitudinal edges of the attachment members being separable by operation of the hinge means to enable the attachment members to be placed around a main pipe upon which the branch pipe means is to be attached. A flexible rectangular heating wire mat having electrical wire means therein adaptable to have electrical current pass therethrough to perform the welding operation is attached to the inner surface of one of the attachment members along a longitudinal side of the wire mat. The longitudinal side of the wire mat is connected to the inner surface of one of the attachment members at a point intermediate the longitudinal edges thereof.

When the welding operation is to be performed, the hinged attachment members are separated along one side thereof by relative pivotal movement about the hinge means. The attachment members are then placed around the main pipe to which they are to be welded, and the attached heating wire mat extends around the main pipe between the attachment members and the main pipe. Because the heating wire mat is connected, by welding or the like, along its longitudinal side to a portion of the interior surface of one of the attachment members which lies between the outer edges thereof, the heating wire mat will overlie the main pipe along longitudinal portions thereof extending adjacent the hinge means and the opposite side of the attachment members between which the separable gap is formed to permit the attachment members to be placed over the main pipe.

Thus, with the present invention, the attachment members are connected with each other along one of their longitudinal sides by a joint or hinge means and are separated from each other on their opposite side by a gap, with the flexible rectangular heating wire mat being secured only along a length extending on one side thereof at a point on the inner circumference of the attachment members which is displaced in regard to the two longitudinal sides of the attachment members.

The various features of novelty which characterize the invention are pointed out with particularity in the claims annexed to and forming a part of this disclosure. For a better understanding of the invention, its operating advantages and specific objects to be attained by its use, reference should be had to the accompanying drawings and descriptive matter in which there is illustrated and described preferred embodiments of the invention.

DETAILED DESCRIPTION OF THE PREFERRED EMBODIMENT

Figure 1:
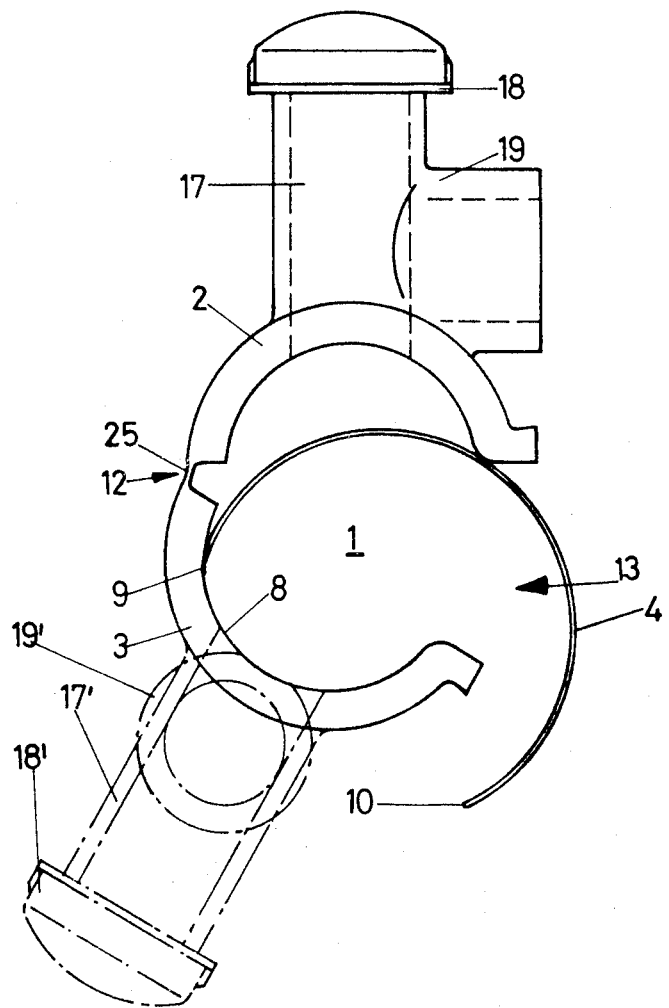
FIG. 1 is a transverse view of a molded centering piece of weldable plastic shown in its spread-apart position ready for assembly, and having a heating wire mat secured on one part thereof.

Referring now to the drawings, and more particularly to FIG. 1, there is shown a molded centering piece or attachment subassembly 1, consisting of an upper attachment member 2 and a lower attachment member 3 shown in an open or spread position. Arranged on the member 2 is a pipe connection 17 provided with a seal 18 to receive a boring tool (not shown), a socket 19, for example, a welding sleeve, being secured laterally on the connection 17 for attachment of a branch pipe. Corresponding to the upper attachment member 2, parts 17', 18' and 19' may be arranged on the lower attachment member 3. The aforementioned boring tool serves in a known manner for the production of a boring 14 or 14' in the pipeline 5 (see FIG. 3).

The upper and lower attachment members 2 and 3 are interconnected along one longitudinal side 12 thereof by hinge means which may comprise either a thin, flexible connecting web 25 or any other suitable joint. In the embodiment depicted in FIG. 1, the hinge 25 is integrally formed with the members 2 and 3 and permits the integral production of members 2 and 3. On the opposite side 13 of the attachment members 2 and 3 there is formed a gap 20 extending between the two longitudinal edges of the members 2 and 3 located opposite the longitudinal side 12. The hinge 25 enables relative pivotal movement between the members 2 and 3, and thus, the members 2 and 3 may be separated so that their longitudinal edges located on the side 13 of the subassembly 1 may be spread at least far enough that the molded centering piece 1 can be placed around the outside of the main pipeline 5. Thus, the degree of separation between the longitudinal edges on the side 13 of the attachment subassembly must exceed the corresponding outside diameter of the main pipeline 5 upon which the subassembly is to be mounted.

Figure 3:
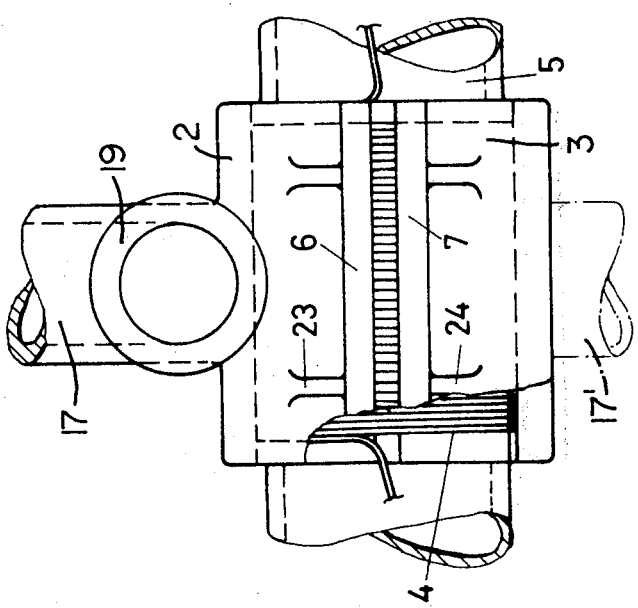
FIG. 3 is a transverse view of the welded plastic assembly shown in FIG. 2.

A flexible, rectangular heating wire mat 4 is secured along one of its longitudinal sides 9 on the interior surface 8 of the bottom attachment member 3. It is to be understood that the rectangular wire mat 4 may be secured upon either of the members 2 or 3, for example, by welding or the like, at a point along the interior surface thereof intermediate the outer longitudinal edges of either of the members 2 or 3. The heating wire mat 4 comprises two longitudinal sides 9 and 10 and the length of the mat 4 between the longitudinal side 10 and the longitudinal side 9 is so dimensioned that a gap 11 of at least 1 millimeter is formed when the device is in the assembled state with the wire mat 4 being placed round the main pipe 5. Thus, with the gap 11 appearing between the side 9 and the side 10, as shown in FIG 3, there is permitted a certain amount of sliding of the mat in the welding surface during the subsequent welding operation and, thus, the tight bearing of the parts to be joined may be effected. That is, when the members 2 and 3 are placed around the main pipe 5 to which they are to be joined, they may be firmly pressed thereabout without interference by abutment of the ends of the heating wire mat 4.

The attached portion of the edge 9 and of the gap 11, respectively, shown at point 15 of FIG. 3, are so arranged on the interior surface 8 of the molded centering piece 1, that the heating wire mat extends continuously past the two longitudinal sides 12 and 13 and the boring 14, 14'. That is, since the sides 9 and 10 of the wire mat 4 are displaced relative to the longitudinal edges of the interior surfaces of the members 2 and 3, the gap 11 will be formed at a point which is displaced from the gaps which may appear either adjacent to hinge 25 on the side 12 of the assembly, or at the gap 20 on the side 13 of the assembly.

Figure 2:
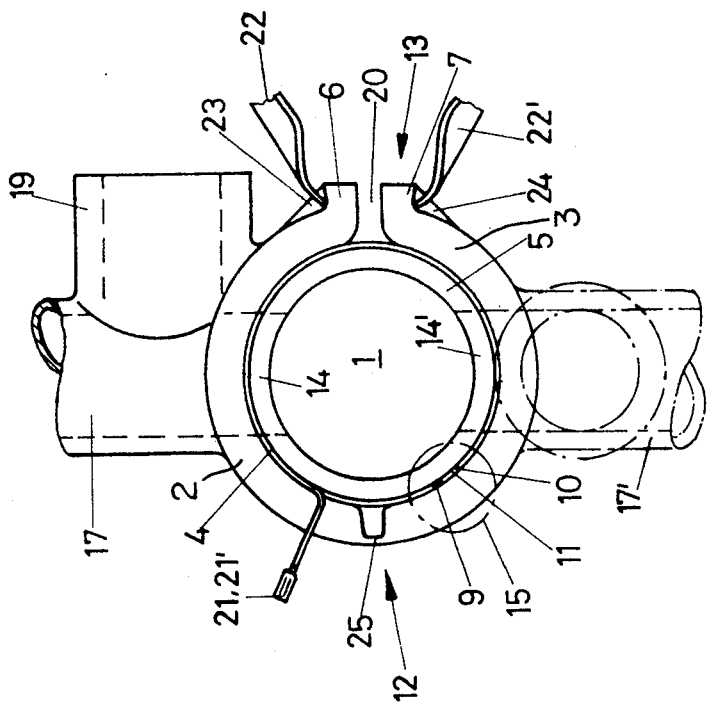
FIG. 2 is side elevation of the plastic subassembly of the present invention shown welded with a main pipeline.

The mat 4 is preferably formed of a wire sheathed with weldable plastic which extends in a circumferential direction, as best seen in FIG. 2, between the sides 9 and 10 of the rectangular heating wire mat 4.

FIGS. 2 and 3 show the molded centering piece or attachment subassembly 1 surrounding the main pipeline 5 in a position in which the parts 2, 3, 4 and 5 are welded with each other by applying the required welding heat in the form of electrical power through wire connections 21, 21'. The upper attachment member 2, as well as the bottom or lower attachmemt member 3, are provided on side 13 preferably with a spring flange 6 and 7 which may extend over the entire longitudinal width of the assembly 1.

A collet, which is represented only by its ends 22, 22' in FIG. 3, and which is removed after the welding operation, extends over the spring flanges 6, 7, embracing the pipeline 5 and pressing the members 2, 3 together by spring force during the welding operation. The gap 20 is so dimensioned that the spring flanges 6, 7 may be brought together in contact with each other when the assembly is in the assembled state. In order to prevent the collet from slipping off the flanges 6 and 7, or from being laterally displaced thereon, the outer surfaces of the spring flanges 6, 7 are preferably provided with a slight inward inclination. Furthermore, webs 23 and 24 are formed on the flanges 6, 7 and spaced from each other in an arrangement such that one collet can be applied with a small pipe diameter, and two collets with a larger pipe diameter to ahcieve a possibly uniform welding and bearing pressure.

Of course, after the performance of the welding operation in accordance with the present invention, a boring operation may be performed, in a manner known to those skilled in the art, to drill an opening which will extend through the wire mat 4 and insure proper flow passages through the assembly. This boring operation may be performed in accordance with the teachings of U.S. Pat. No. 3,240,226, where a boring tool of the type which may be utilized in the assembly of the present invention is disclosed.

The aforedescribed molded centering piece or attachment assembly can be mounted on a pipeline at the site where welding is to be performed by simple attachment, without elaborate operation. It can be produced as an integral modular unit, for example, by plastic injection molding and it is designed for easy assembly. During the subsequent welding operation, a stable and tight connection is achieved between the pipeline and the molded centering piece embracing the pipeline substantially across the entire circumference of both members. In addition, the branching point is further strengthened by the sheathing and the wide looping angle of the heating wire mat. As a result, an optimum reduction of welding stresses is achieved.

While a preferred embodiment of the invention has been shown and described in detail to illustrate the application of the inventive principles, it will be understood that the invention may be embodied otherwise without departing from such principles.

What is claimed is:

1. A weldable moldular subassembly for enabling branch pipe means to be connected by welding to a main pipe formed of moldable plastic material, said subassembly comprising a pair of arcuate attachment members formed of moldable plastic material, each having a concave inner surface, the inner surface of each of said attachment members extending between a pair of longitudinal edges thereof, branch pipe means affixed to at least one of said attachment members, hinge means pivotally connecting said attachmemt members along one of the longitudinal edges of each of said attachment members with the longitudinal edge of the other of said attachment members to enable said subassembly to be placed around a main pipe to which said subassembly is to be welded, and a flexible rectangular heating wire mat having electrical wire means adapted to have electric current pass therethrough to weld said subassembly to said main pipe, said wire mat having a pair of generally parallel longitudinal sides with one of said longitudinal sides being connected along the inner surface of one of said attachment members at a point intermediate the longitudinal edges thereof, said connected longitudinal side extending general parallel to the longitudinal edges of the inner surface to which it is connected, whereby said attachment members may be placed to surround said main pipe with said wire mat interposed therebetween to effect welding together of said attachment members and said main pipe by passage of electrical current through said wire mat.

2. A subassembly according to claim 1 wherein said attachment members are formed as a single unitary modular unit integrally joined together by said hinge means.

3. A subassembly according to claim 1 wherein said heating wire mat comprises a length extending between said longitudinal sides thereof dimensioned to enable said mat to be placed about said main pipe with a circumferential gap being formed between said longitudinal sides after said subassembly has been welded to said main pipe.

4. A subassembly according to claim 1 wherein said subassembly includes at least one centering point, with said hinge means and said longitudinal edges of said attachment members forming oppositely disposed sides of said subassembly extending longitudinally along said main pipe, said heating wire mat being connected to the interior surface of said one attachment member such that said heating wire mat extends continuously after welding over both longitudinal sides of said subassembly to continuously cover said opposed longitudinal sides thereof and said at least one centering point.

5. A subassembly according to claim 1 wherein said electrical wire means of said rectangular wire mat is formed within said heating wire mat in a position to extend circumferentially between the longitudinal sides of said heating wire mat.

6. A subassembly according to claim 1 wherein each of said longitudinal edges of said attachment members opposite said hinge means have formed thereon a projecting flange adapted to have clamping means attached thereto to press said subassembly about said main pipe during welding.

7. A subassembly according to claim 6 wherein said flanges are formed with inwardly inclined outer surfaces to promote engagement of clamping means thereupon.

* * * * *